(12) United States Patent
Durkee et al.

(10) Patent No.: US 6,998,803 B2
(45) Date of Patent: Feb. 14, 2006

(54) ENHANCED PERFORMANCE FOR DC MOTOR DRIVE SWITCHING

(75) Inventors: John E. Durkee, Wayland, NY (US); David P. Stebnicki, W. Henrietta, NY (US); David J. Stephens, Honeoye Falls, NY (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 0 days.

(21) Appl. No.: 10/825,680

(22) Filed: Apr. 15, 2004

(65) Prior Publication Data

US 2004/0232860 A1   Nov. 25, 2004

Related U.S. Application Data

(60) Provisional application No. 60/463,378, filed on Apr. 16, 2003.

(51) Int. Cl.
*H02P 1/00*   (2006.01)

(52) U.S. Cl. .................. 318/281; 318/256; 318/283

(58) Field of Classification Search ............... 318/281, 318/256, 283, 285, 471, 472, 103
See application file for complete search history.

(56) References Cited

U.S. PATENT DOCUMENTS

| 3,774,082 A | | 11/1973 | Chang |
| 4,066,937 A | | 1/1978 | Pfarrer et al. |
| 4,689,533 A | * | 8/1987 | Yang ........................... 318/281 |
| 5,502,609 A | | 3/1996 | Thomas et al. |
| 5,793,171 A | | 8/1998 | Hyashi et al. |
| 6,049,178 A | * | 4/2000 | Sheu et al. .................. 315/291 |

* cited by examiner

*Primary Examiner*—Karen Masih
(74) *Attorney, Agent, or Firm*—Harness, Dickey & Pierce, PLC

(57) ABSTRACT

An improved drive circuit is provided for a DC motor. The drive circuit includes: a DC power source; a relay having a normally open contact and a normally closed contact; a DC motor electrically connected through the normally open contact of the relay to the power source; and a discharge circuit connected in parallel to the DC motor. More specifically, the discharge circuit is coupled to the normally closed contact of the relay and operable to inhibit current flow from the DC motor until the relay has settled in a closed position.

16 Claims, 5 Drawing Sheets

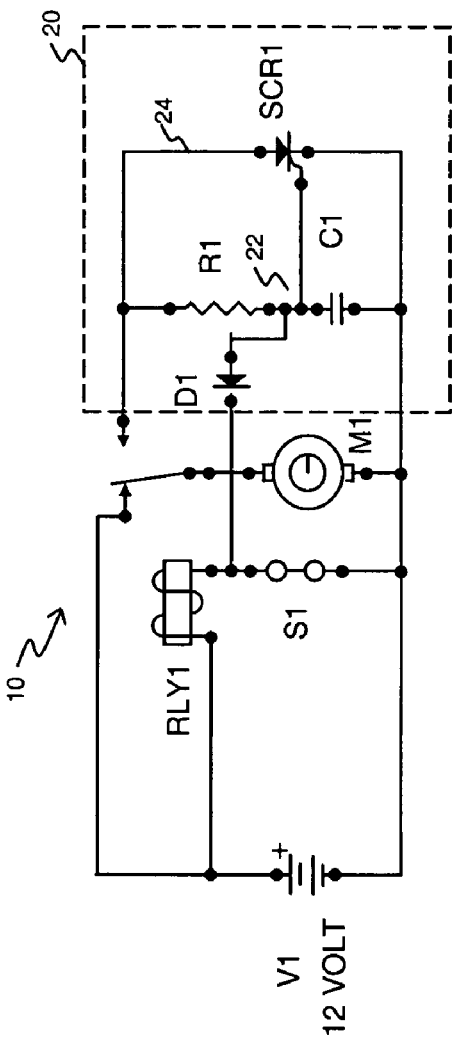
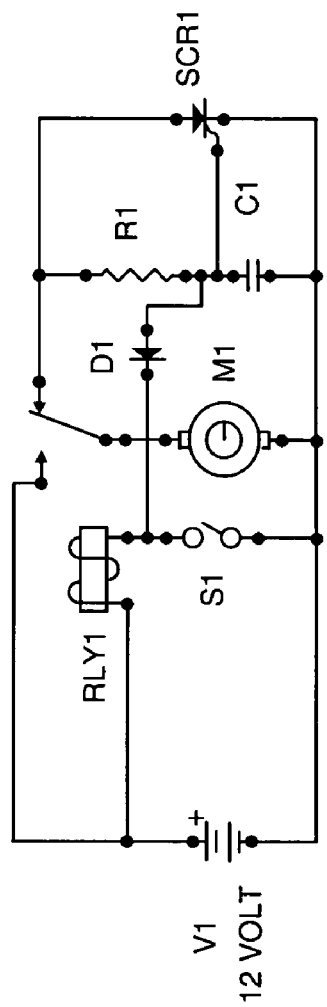

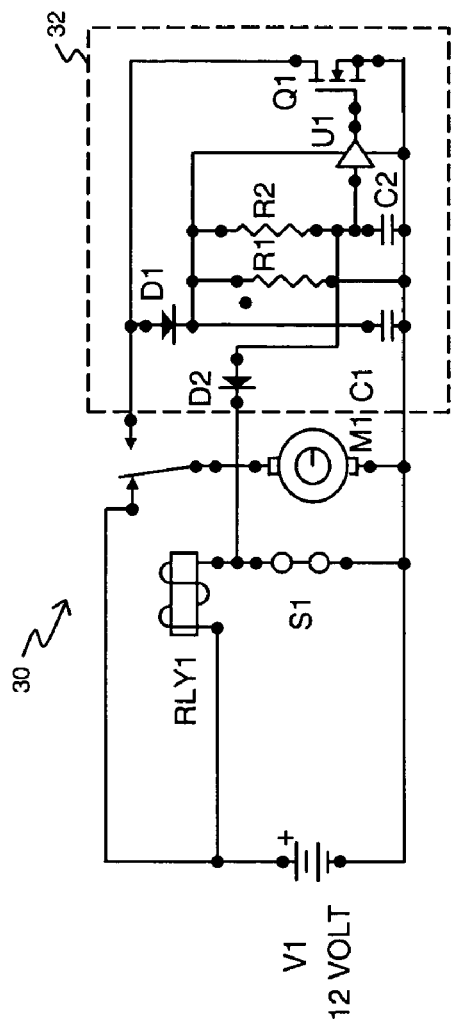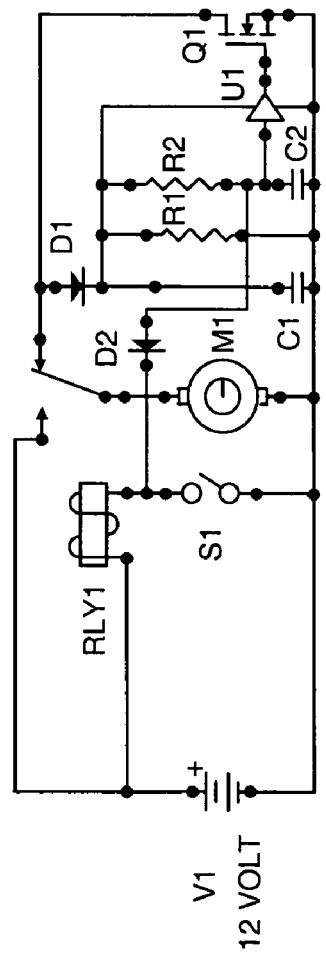

ENHANCED PERFORMANCE FOR DC MOTOR DRIVE SWITCHING

This application claims priority under 35 U.S.C. §119(e) to U.S. Provisional Application No. 60/463,378 filed on Apr. 16, 2003, and entitled "Enhanced Performance for DC Motor Drive Switching" the specification and drawings of which are hereby expressly incorporated by reference.

FIELD OF THE INVENTION

The present invention relates generally to a drive circuit for a DC motor and, more particularly, to a circuit arrangement that inhibits current flow to the closed contacts of a relay switch.

BACKGROUND OF THE INVENTION

FIG. 1 illustrates an exemplary drive circuit for a DC motor. In this exemplary embodiment, the DC motor M1 can be connected to a battery by a single pole double throw relay RLY1 the operation of which is controlled by switch S1. When switch S1 is closed, the relay armature contact will move to the normally open contact, connecting the positive lead of the motor to the battery. This will cause a current to flow which will increase from zero to a maximum over a period of time controlled by the motors inductance. The magnitude of the current in amps will be the battery voltage divided by the motors DC resistance and will approach the motors specified "locked rotor" current. As the armature comes up to speed, the current will decrease to the motors running current, which will be a function of the load on the motor, if any.

Start up current for an exemplary motor circuit is shown in FIG. 2. These results were obtained using a motor with a D.C. resistance of 0.3 ohms, an inductance of 100 micro henries and a no load current of 5 amps connected to a 12 volt battery. When switch S1 is opened, the relay armature contact will move back to the normally closed contact which, being connected to the motor positive lead, will put a short circuit across the motor, thereby causing the motor to stop within a few revolutions. At the instance of disconnect from the battery, the motor becomes a generator whose voltage will be that of the battery, and whose instantaneous stored current will be equal to that applied to the motor at start up. This current will be required to flow through the normally closed contacts. FIG. 3 illustrates the current flow through the contacts of a relay the exemplary motor circuit.

Referring to FIG. 4, when power is applied to the relay coil, the armature moves to the normally open contact and is held there by the magnetic force generated. When coil power is released the armature returns to the normally closed contact and is held there by the return spring. The coils magnetic force causes a greater normally open contact pressure than that caused by the return spring tension on the normally closed contact. Because of this, relays generally have a lower maximum switching current specified for the normally closed contacts than for the normally open contacts. The normally closed contact current can range from 50% to 75% of the normally open contact current.

When DC motor braking relay contacts close, the possibility exists of the contacts welding at the instance of contact. Such welding can significantly reduce the life cycle of the relay. Therefore, it is desirable to provide a circuit arrangement that inhibits current flow until after the contacts are fully closed, thereby greatly extending the electrical life of the contacts.

SUMMARY OF THE INVENTION

In accordance with the present invention, an improved drive circuit is provided for a DC motor. The drive circuit includes: a DC power source; a relay having a normally open contact and a normally closed contact; a DC motor electrically connected through the normally open contact of the relay to the power source; and a discharge circuit connected in parallel to the DC motor. More specifically, the discharge circuit is coupled to the normally closed contact of the relay and operable to inhibit current flow from the DC motor until the relay has settled in a closed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIGS. 5A and 5B are schematics of an exemplary drive circuit for a DC motor in accordance with the present invention; and FIGS. 6A and 6B are schematics of an alternative drive circuit for a DC motor in accordance with the present invention.

DETAILED DESCRIPTION OF THE PREFERRED EMBODIMENTS

Figure 1:
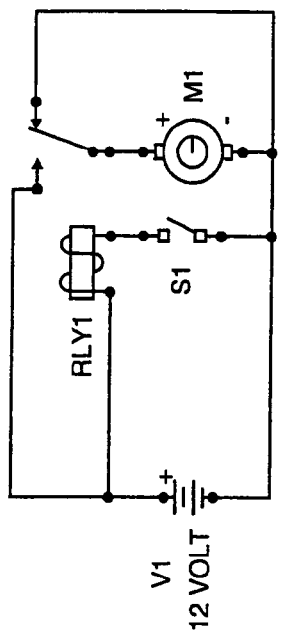
FIG. 1 is a schematic for an exemplary drive circuit for a DC motor.
Figure 2:
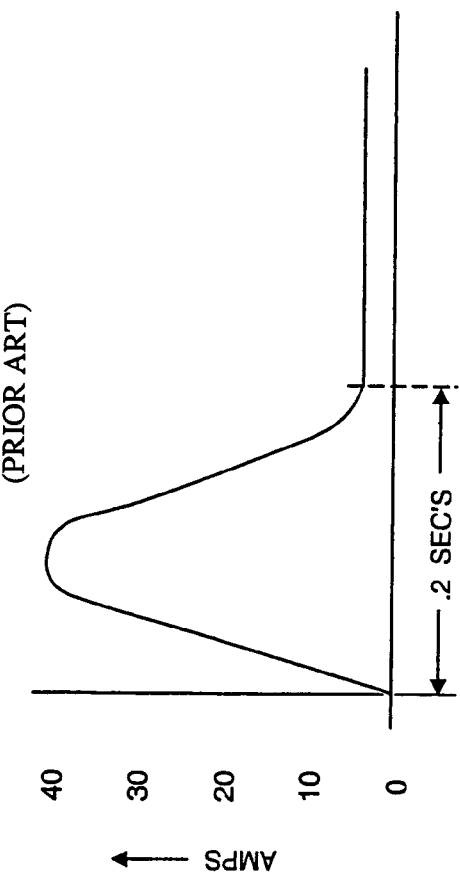
FIG. 2 is a diagram illustrating start up current for a motor in the exemplary motor circuit.
Figure 3:
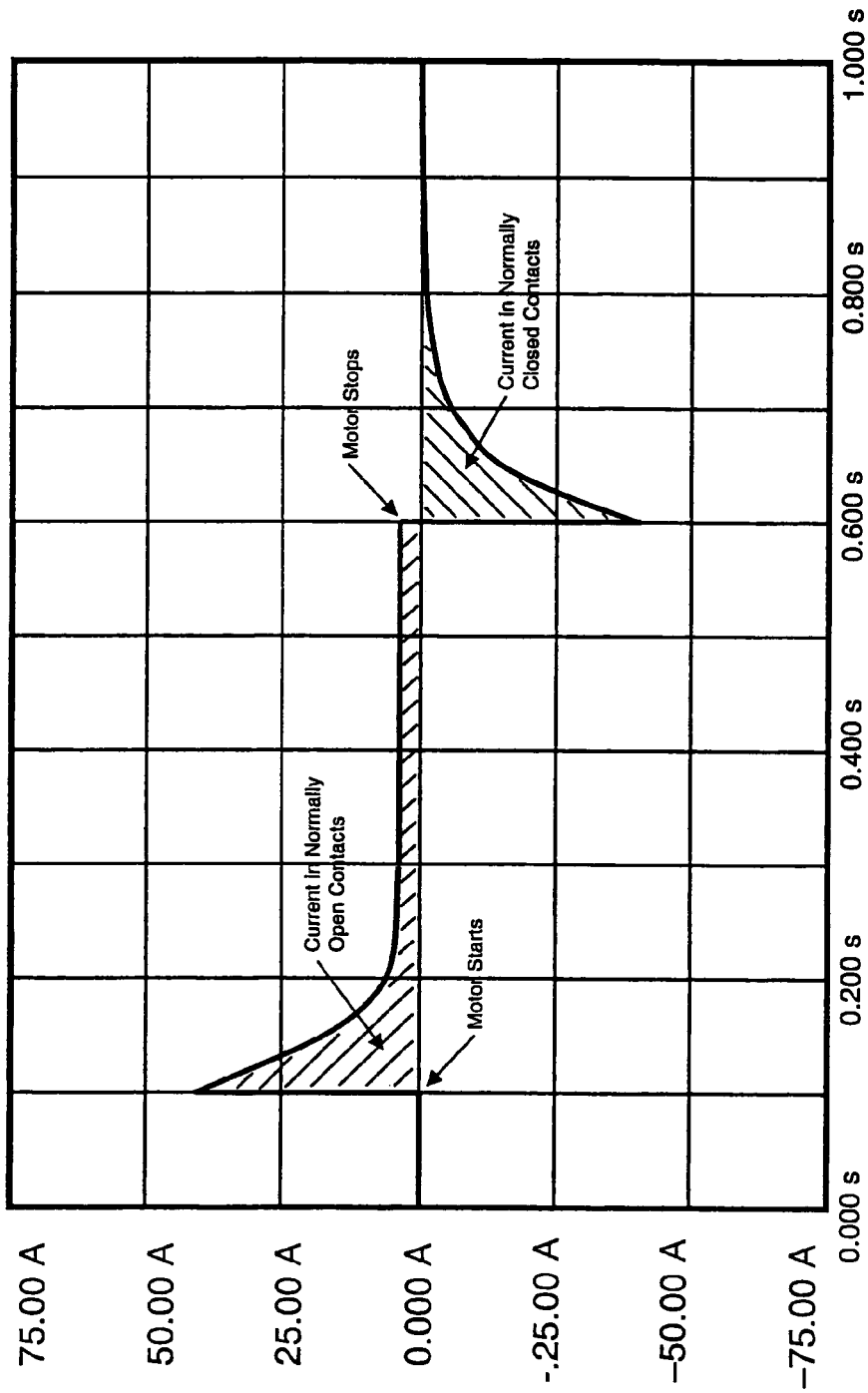
FIG. 3 is a diagram illustrating the current flow through the contacts of a relay the exemplary motor circuit.
Figure 4:
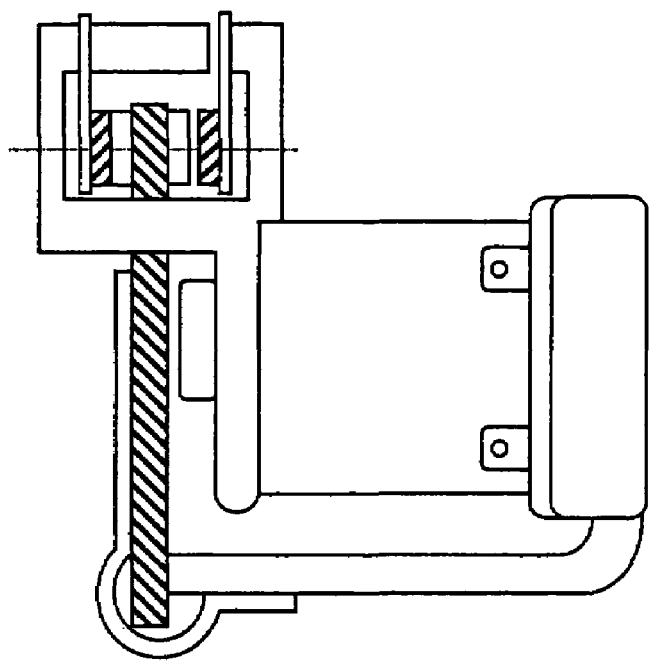
FIG. 4 is a diagram of an exemplary relay device employed in the exemplary motor circuit.

In accordance with the present invention, an improved drive circuit is provided for a DC motor. Briefly, the drive circuit includes a discharge circuit arrangement having at least one switched solid state device coupled to the normally closed contact of the relay. The switched solid state device is operable to discharge current flow from the DC motor when the relay is in the normally closed contact position. To do so, stored motor energy is used to power the switched solid state device as well as any remaining circuitry of the arrangement. In addition, the discharge circuit arrangement is designed to inhibit the current flow from the motor until after the contacts of the relay are in a fully closed position. While the following description is provided with reference to particular switched solid state devices and certain circuit arrangements, it is readily understood that other types of switched solid state devices and/or other circuit arrangements are within the broader aspect of the present invention.

FIGS. 5A and 5B illustrate an exemplary drive circuit for a DC motor in accordance with the present invention. The exemplary drive circuit 10 generally includes a DC power source V1 (e.g., a battery), a switch S1, a relay RLY1, and a DC motor M1, where the DC motor M1 is electrically connected to the power source V1 through the normally open contact of the relay RLY1. As further described below, motor operation is controlled by the switch S1.

When the switch S1 is closed, the relay armature will move from the normally closed position to the normally open position as shown in FIG. 5A, thereby connecting the motor M1 to the power source V1. This will cause current to flow and energize the motor. It is readily understood that the switch may take various forms suitable for the particular application, including but not limited to a mechanical switch or an electrical switch (e.g., a transistor).

When the switch S1 is opened, the relay armature returns to the normally closed position as shown in FIG. 5B, thereby causing the motor M1 to stop. At the instance the motor M1 is disconnected from the power source V1, the motor M1 becomes a generator whose instantaneous stored current is required to flow through the normally closed contact of the relay.

To inhibit current flow from the DC motor until after the contacts are in a fully closed position, the drive circuit 10 further includes a discharge circuit arrangement 20 coupled to the normally closed contact of the relay. The discharge circuit arrangement 20 is comprised of a delay circuit 22 that controls the operational state of a switched solid state device residing in a parallel discharge circuit path 24. In this exemplary embodiment, the delay circuit is a resistor R1 and a capacitor C1 coupled in series; whereas the switched solid state device is a silicon controlled rectifier SCR1, where the gate terminal of the rectifier is electrically coupled between the resistor R1 and the capacitor C1. It is envisioned that a triac may be used in place of the silicon controlled rectifier.

Initially, the capacitor C1 is charged through the resistor R1 by an applied voltage from the motor M1. When the voltage of the capacitor C1 reaches the gate turn-on voltage for the rectifier SCR1, the rectifier turns on, thereby discharging the stored current in the motor to ground. The rectifier SCR1 remains latched until the discharged current drops below the holding current of the rectifier, typically a few milliamps. Depending on the application, the capacitor C1 should be chosen to provide sufficient time delay to insure that the normally closed contacts are fully closed. In addition, the resistor R1 may be chosen to ensure gate turn on current under worst-case conditions and the rectifier may be chosen to handle the current flow from the motor at the applicable cycle repetition rate and maximum ambient temperature required. It is further envisioned that a diode D1 may be optionally coupled between the delay circuit and the switch S1 to facilitate quicker discharge of the capacitor C1.

FIGS. 6A and 6B illustrate an alternative drive circuit 30 for a DC motor in accordance with the present invention. In this exemplary embodiment, a field-effect transistor Q1 is employed as the solid state device. However, it is envisioned that other types of solid state devices (e.g., a bipolar transistor) may be used. In addition, a more sophisticated control circuit is required to control the operational state of the transistor Q1 as described below. While an exemplary control circuit is further described below, it is readily understood that other types of control circuits, including software-implemented control instructions, may be employed to control the operation of the solid state device.

Referring to FIG. 6A, an exemplary control circuit 32 may be comprised of multiple circuit paths. First, a diode D1 is coupled in series to a first capacitor C1. In a parallel arrangement with the first capacitor C1 is a first resistor R1 as well as a circuit path comprised of a second resistor R2 coupled in series with a second capacitor C2. As noted above, an additional diode D2 may be optionally used to ensure rapid discharge of the second capacitor C2. Lastly, an integrated circuit U1 is interposed between the discharge circuit path and the remainder of the control circuit. Due to its limited power requirements, a CMOS AND gate is preferably used; however, it is readily understood that other similar devices could be used in place of the integrated circuit U1. An input terminal of the gate U1 is coupled between the second resistor R2 and the second capacitor C2 and an output terminal is coupled to the gate terminal of the transistor Q1.

In operation, the first capacitor C1 is charged through the diode D1 by an applied voltage from the motor M1. The first capacitor C1 in turn charges the second capacitor C2. In other words, the first capacitor C1 serves as a power supply for the remainder of the control circuit. When the voltage of the second capacitor C2 reaches the gate turn-on voltage for the CMOS AND gate, it turns on the transistor Q1, thereby discharging the stored current in the motor to ground. Thus, the first capacitor C1 supplies circuit power for a time determined principally by the value of the first resistor R1, so that the first capacitor and first resistor may be chosen to maintain the CMOS AND gate and the transistor Q1 in an active state until the motor has stopped. Once the current from the motor M1 has dissipated, the remaining voltage stored in the first capacitor C1 is discharged through the first resistor to ground, thereby turning off the transistor Q1. It is readily understood that the second resistor R2 and the second capacitor C2 are chosen to delay turn on of the transistor until the normally closed contacts are fully closed. In addition, the transistor Q1 is chosen to handle the motor short circuit current at the cycle repetition rate and maximum ambient temperature required.

While the above description has been provided with reference to particular circuit arrangements, it is readily understood that other circuit arrangements may fall within the broader aspects of the present invention. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An improved drive circuit for a DC motor, comprising:
   a DC power source;
   a relay having a normally open contact and a normally closed contact;
   a DC motor electrically connected to the power source through the normally open contact of the relay; and
   a discharge circuit arrangement having a switched solid state device and coupled to the normally closed contact of the relay, the discharge circuit arrangement operable to inhibit current flow from the DC motor until the relay is in a normally closed contact position.

2. The improved drive circuit of claim 1 wherein the discharge circuit arrangement includes a delay circuit and a discharge circuit path, where the delay circuit controls an operational state of the switched solid state device using energy stored in the DC motor.

3. The improved drive circuit of claim 2 wherein the switched solid state device is disposed in the discharge circuit path and operable to discharge current flow from the DC motor when the relay is in the normally closed contact position.

4. The improved drive circuit of claim 2 wherein the delay circuit operably delays the discharge of current flow through the switched solid state device until the relay is in the normally closed contact position.

5. The improved drive circuit of claim 2 wherein the delay circuit is comprised of a resistor and a capacitor coupled in series.

6. The improved drive circuit of claim 1 wherein the switched solid state device is selected from the group consisting of a silicon controlled rectifier, a triac and a transistor.

7. The improved drive circuit of claim 1 wherein the switched solid state device is further defined as a field-effect transistor.

8. An improved drive circuit for a DC motor, comprising:
   a DC power source;
   a relay having a normally open contact and a normally closed contact;
   a DC motor electrically connected to the power source through the normally open contact of the relay; and
   a discharge circuit arrangement having a switched solid state device and coupled to the normally closed contact of the relay, the discharge circuit arrangement operable to control an operational state of a switched solid state device using energy stored in the DC motor.

9. The improved drive circuit of claim 8 wherein the switched solid state device is operable to discharge current flow from the DC motor when the relay is in the normally closed contact position.

10. The improved drive circuit of claim 8 wherein the discharge circuit arrangement includes a delay circuit and a discharge circuit path containing the switched solid state device.

11. The improved drive circuit of claim 10 wherein the delay circuit operably delays the discharge of current flow through the switched solid state device until the relay is in the normally closed contact position.

12. The improved drive circuit of claim 10 wherein the delay circuit is comprised of a resistor and a capacitor coupled in series and the switched solid state device is further defined as a controlled rectifier, such that a gate terminal of the rectifier is coupled between the resistor and the capacitor.

13. The improved drive circuit of claim 8 wherein the switched solid state device is further defined as a field-effect transistor.

14. An improved drive circuit for a DC motor, comprising:
   a DC power source;
   a relay having a normally open contact and a normally closed contact;
   a DC motor electrically connected to the power source through the normally open contact of the relay; and
   a field-effect transistor having a drain terminal, a source terminal and a gate terminal, where the drain terminal is coupled to the normally closed contact of the relay.

15. The improved drive circuit of claim 14 wherein the field-effect transistor is operable to discharge current flow from the DC motor when the relay is in a normally closed contact position.

16. The improved drive circuit of claim 14 further comprises a control circuit coupled to the normally closed contact of the relay and operable to delay the discharge of current flow through the field-effect transistor until the relay is in the normally closed contact position.

\* \* \* \* \*

UNITED STATES PATENT AND TRADEMARK OFFICE
CERTIFICATE OF CORRECTION

PATENT NO. : 6,998,803 B2 Page 1 of 1
APPLICATION NO. : 10/825680
DATED : February 14, 2006
INVENTOR(S) : John E. Durkee et al.

It is certified that error appears in the above-identified patent and that said Letters Patent is hereby corrected as shown below:

On the Title Page,
Item (56), References Cited, U.S. Patent Documents, please insert the following reference:

5,963,442               10/1999               Yoshida et al.

Item (56), References Cited, Foreign Patent Documents, please insert the following reference:

JP A 11-189032        7/1999               Japan

Signed and Sealed this

Eighteenth Day of December, 2007

JON W. DUDAS
*Director of the United States Patent and Trademark Office*